(Model.)
J. P. WRIGHT.
POWDER DUSTER.
No. 478,901. Patented July 12, 1892.
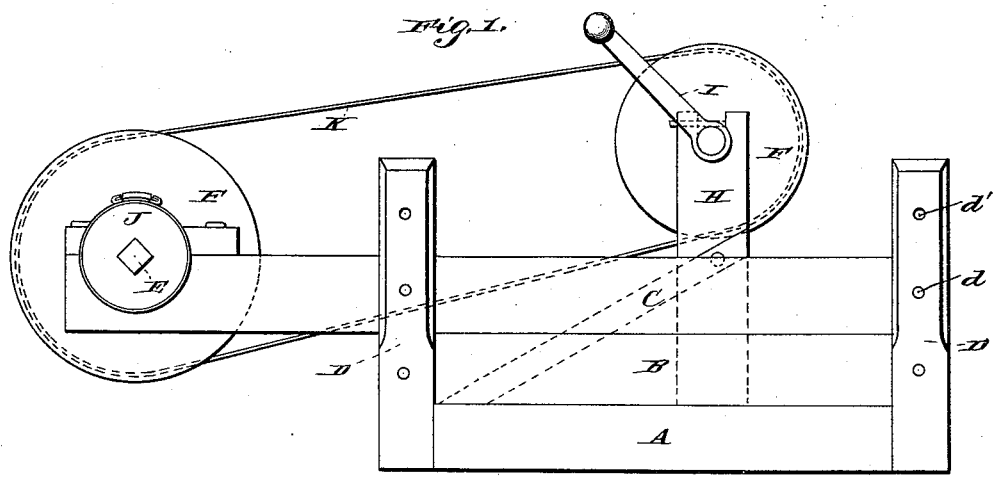
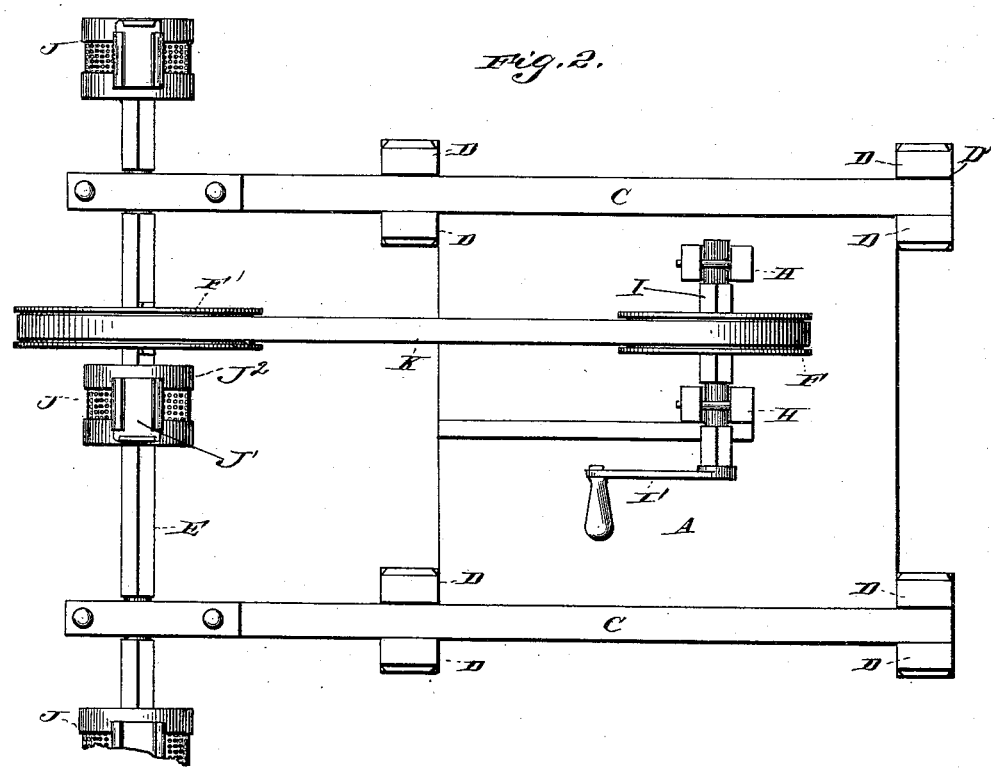
Witnesses:
Jno. H. Power
J. C. Murphree
Inventor:
John P. Wright
THE NORRIS PETERS CO., PHOTO-LITHO., WASHINGTON, D. C.

UNITED STATES PATENT OFFICE.

JOHN P. WRIGHT, OF THOMASTON, TEXAS.

POWDER-DUSTER.

SPECIFICATION forming part of Letters Patent No. 478,901, dated July 12, 1892.

Application filed December 14, 1891. Serial No. 415,070. (Model.)

*To all whom it may concern:*

Be it known that I, JOHN P. WRIGHT, of Thomaston, in the county of De Witt and State of Texas, have invented a new and useful Improvement in Poison-Distributers, of which the following is a specification.

My invention is an improvement in poison-distributers, and is intended especially for use in destroying cotton-worms; and it has for an object to provide a simple inexpensive construction which can be conveniently carried on a farm cart, wagon, or other vehicle and can be easily operated by the driver to effect the desired dusting of the plants.

The invention consists in certain novel constructions and combinations of parts, as will be hereinafter described, and pointed out in the claims.

In the drawings, Figure 1 is a side view, and Fig. 2 is a top plan view, of my improvement.

The distributer is shown as formed with a bed or platform A, which is adapted to be placed upon and carried by an ordinary farm cart or wagon or other vehicle. This bed is provided near its front end with uprights H, forming supports for the hand-shaft I, which has a pulley F and a crank-handle I', so that it may be conveniently turned at will by the operator, who may be the driver, as is manifest.

At its sides, near its opposite ends, the bed is provided with uprights D, arranged in pairs, forming keepers D', the keepers at each side serving to receive the side beams C, which may be held in any desired vertical adjustment by the pins or bolts $d$, the keepers being provided with a series of perforations $d'$ to receive such bolts $d$ and permit the desired adjustment of the side beams. This adjustment of the side beams is for the purpose of adapting the machine for use in dusting plants of different heights.

The distributer-shaft E is journaled to the side beams near their rear ends and is provided with a pulley F', geared by belt K with the pulley F on the hand-shaft, so that the turning of the latter will operate the distributer-shaft as desired. This shaft is made with portions angular in cross-section to receive the distributers J, which are in the form of cylindrical sieves having central angular sleeves to slide on the angular portions of the shaft E and also provided with doors J' for the introduction of the poison. At their ends the sieves J have bands $J^2$, which may be adjusted along the sieves to regulate the amount of sieve-surface exposed, and so control the amount of powder distributed. The angular sleeve fitting the angular portion of the shaft prevents the waste of powder at the center of the sieves.

In practice the bed or platform A may be nailed fast to the cart or wagon.

It will be seen that the distributer-shaft is not operated by the moving part of the machine, but is entirely under control of the operator, so that in turning at the end of rows and in passing over parts clear of plants the powder is not wasted.

Any suitable poison—such as paris-green or london-purple—may be employed.

Having thus described my invention, what I claim, and desire to secure by Letters Patent, is—

1. An improved poison-distributer comprising a bed or platform provided at its opposite sides with keepers, the side beams fitted in said keepers, devices whereby said beams may be secured at different heights in the said keepers, the distributer-shaft journaled at the rear ends of the said side beams and provided with the poison-distributers, the hand-shaft geared with the distributer-shaft, and the supports for the hand-shaft, said supports being mounted on the bed or platform, substantially as set forth.

2. In a poison-distributer, a distributer proper consisting of a cylinder having ends and a perforated side and provided with bands adjustable along the perforated sides, said bands being independent of the distributer ends, whereby the discharging-surface of the distributer may be varied without affecting the holding capacity of said distributer, substantially as set forth.

3. The improved poison-distributer, substantially as herein described and shown, consisting of the bed or platform adapted to be secured upon a cart or wagon and provided at its sides with uprights forming keepers, the uprights H, mounted on said bed, the hand-shaft journaled in the said uprights and provided with a pulley and a handle, the side beams fitted in the keepers, devices for securing the side beams at different heights in the keepers, the distributer-shaft journaled to the side beams and provided with a pulley, a belt connecting said pulley with that of the hand-shaft, and the perforated distributing-cylinders having central tubular portions fitting on the distributer-shaft and provided with adjustable bands whereby to regulate the discharge of material, substantially as set forth.

JOHN P. WRIGHT.

Witnesses:
JNO. H. POWER,
J. C. MURPHREE.